INVENTOR.
Daniel W. Kennedy

United States Patent Office 3,517,202
Patented June 23, 1970

3,517,202
ROTATING-MIRROR OPTICAL SCANNING SYSTEM WITH OPTICAL PATH LENGTH COMPENSATION
Daniel W. Kennedy, Watertown, Mass., assignor, by mesne assignments, to the United States of America as represented by the Secretary of the Navy
Filed Nov. 14, 1967, Ser. No. 682,839
Int. Cl. G01n 21/30
U.S. Cl. 250—219                    4 Claims

ABSTRACT OF THE DISCLOSURE

In a photographic memory system for computers, a rotating mirror optical readout system is proposed whereby the path length of the light transmitted by the photographic plate to the photodetectors is kept constant as the mirror rotates. The image is focused after reflection, thus eliminating Keystone distortion or blurring due to differing path lengths generated as the mirror face rotates toward and away from the plate.

The invention described herein may be manufactured and used by or for the Government of the United States of America for governmental purposes without the payment of any royalties thereon or therefor.

This invention relates to a readout system for use with a photographic storage system for computers. More particularly a system utilizing a high speed rotating mirror assembly is employed to reflect binary-digital information recorded on a photographic medium onto a bank of photoelectric sensors.

The basic advantage of photographic storage is the high density of stored data now achievable with present photographic techniques. Concomitant with the high storage densities is the requirement that any mechanical scanning device must have sufficent resolution to be able to pick out the individual data points from the high density matrix. While problems due to vibration of the rotating mirror have been solved, the Keystone distortion problem as well as the problem of varying intensity of the light still persist to degrade the system.

Some of the more recent optical readout devices employ a rotating mirror scanning system, having an objective lens between a matrix and a rotating mirror assembly. One of the problems with this type of readout system is the variation in path length as the mirror assembly rotates causing the mirror faces to approach and recede from the objective lens. This results in what is known as Keystone distortion caused by the image being out of focus especially at the boundaries of the photographic plate. To eliminate this differential a curved plate has been used; but since one of the chronic problems in photographic memory storage is cracking or scarring of the photographic plate, causing the loss of the information on the entire plate, a flat plate is more desirable as a storage device. Bending the photographic plate increases the likelihood that damage will occur. By providing for an optical system employing a constant path length, the use of a flat photographic plate is made possible.

A constant path length is provided in the subject invention by focusing the light from the matrix after reflection by the rotating mirror. A constant path length is achieved because as the mirror rotates a portion of the mirror comes closer to the matrix. By providing that this portion of the mirror scan a section of the matrix which is farther from the mirror, the approach of the mirror to the matrix is compensated.

The provision of a rotating mirror between the data plate and the objective lens reduces the problem of variation in intensity of the light transmitted from the plate to the photoelectric detectors. In prior systems, with the rotating mirror placed after the objective lens, the mirror surface would tend to translate out of the light path as it rotated to alter the direction of the light, and would therefore cause non-uniform light transmission for different regions of the plate. By providing a rotating mirror between the plate and objective lens, the geometry allows the mirror to translate into the light path and thus maintain uniform transmission.

The ability to readout the signal reflected by the mirror is enhanced by placing a half-silvered mirror between the matrix and the rotating mirror such that the reflected light from the rotating mirror is reflected by the half-silvered mirror to the focusing lens. The mirror may be placed at any appropriate angle so as to facilitate this pickoff from the rotating mirror.

It is therefore an object of this invention to provide a system for optically scanning a photographic plate with a rotating mirror whereby the path length between the photographic plate and the detectors is kept substantially constant as the mirror rotates.

It is a further object of this invention to provide a beam splitting device between the photographic plate and the rotating mirror to provide for an optical pickoff from the mirror.

While the readout system described relates to computer systems and will be described in relation thereto, it is to be understood that the invention is not so limited, as the photographic plate may be replaced by any material to be optically scanned such as heat imprinting plastics, fabric or other transparent substances on which can be imprinted digital data.

Other objects, advantages and novel features of the invention will become apparent from the following detailed description thereof when considered in conjunction with the accompanying drawings in which like numerals represent like parts throughout and wherein.

Figure 1:
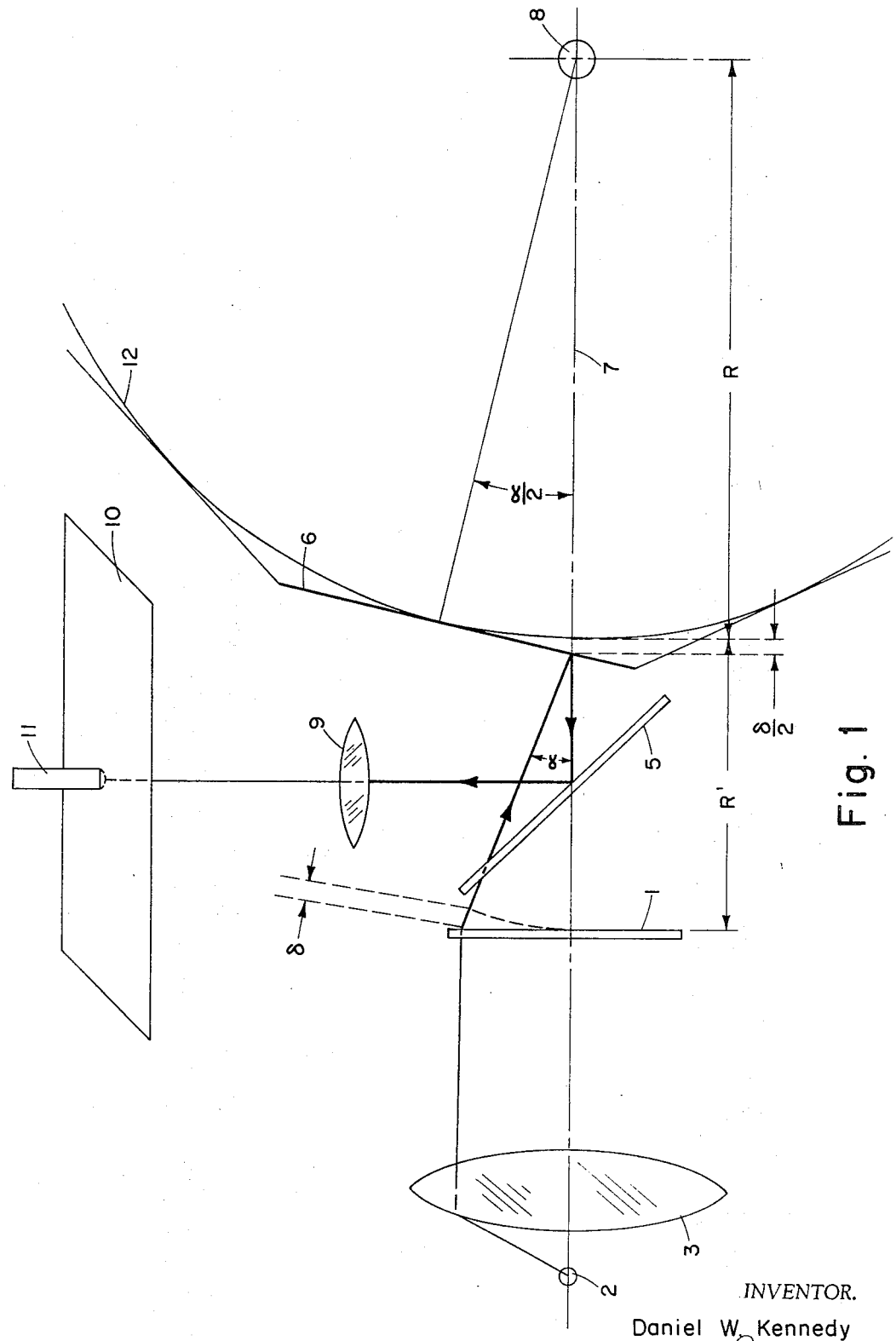
FIG. 1 is a diagrammatic representation of the readout system showing the relationship between the mirror drum radius and the plate-to-mirror separation.

Referring to FIG. 1 a transparent plate 1 is illuminated by source 2 through lens 3. Plate 1 contains binary information located in parallel rows (not shown). Light passing through plate 1 passes through half-silvered mirror 5 to a mirror 6 located on drum 12 which is rotated on axis 8 which intersects and lies perpendicular to optical axis 7. The drum, which preferably has a plurality of mirrors on its periphery, has a center of rotation 8. The light ray returning from mirror 6 is reflected by half-silvered mirror 5 and passes through an objective lens 9 to a plane 10 in which is located a multiplicity of photocells diagrammatically represented by the single photocell 11. It will be appreciated that the multiplicity of photocells are preferably arranged in rows corresponding to the data points on the transparent plate, although with proper mirror skewing, a smaller number of photocells may be used to scan a larger number of data points.

Figure 2:
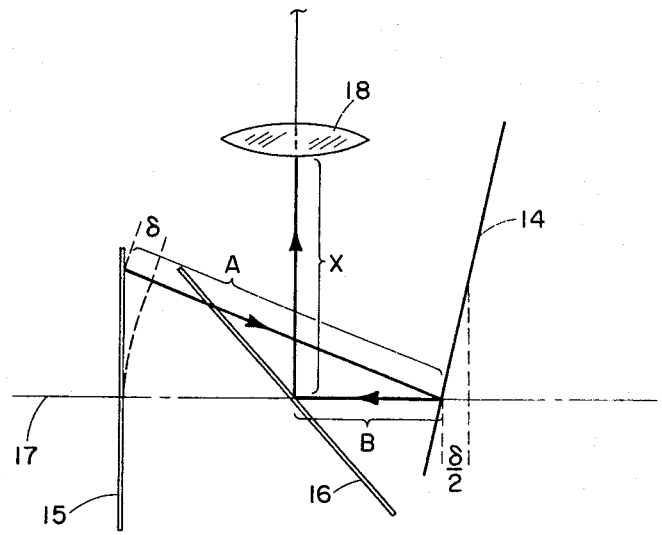
FIG. 2 is a ray diagram of the system shown in FIG. 1.

FIG. 2 is a schematic representation of the system shown in FIG. 1 showing rotating mirror face 14 at the same angle as rotating mirror 6 in FIG. 1. In its tilted position, mirror 14 scans a data section on plate 15 above the optical axis 17. There the path length of the ray is represented by lines ABX. Since X is always constant, it being the distance between the half-silvered mirror 16 at the optical axis 17 and the objective lens 18, the path length can be considered simply AB.

Figure 3:
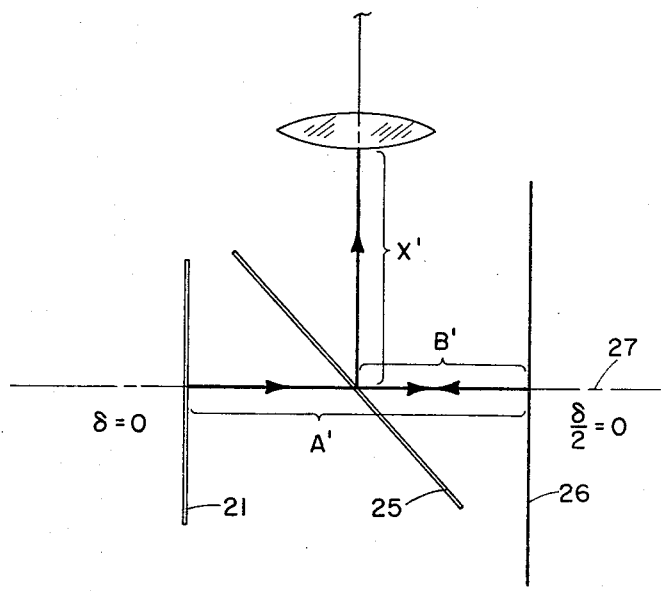
FIG. 3 is a ray diagram of the system shown in FIG. 1 with the mirror scanning a segment of the data plate coincident with the optical axis.

FIG. 3 is a schematic representation of the system shown in FIG. 1, showing rotating mirror face 26 perpendicular to the optical axis 27. In this position the mirror scans a data section at the center of the data plate 21. The path length of the light emanating from the centre of the plate 21 passing to the mirror 26 and then to the half-silvered mirror 25 is shown by the lines A'B'.

As the mirror rotates upwardly to an angle of $\alpha/2$, as shown in FIG. 1, the lower portion of this mirror 14 moves towards the data plate by a distance of approximately $\delta/2$. The mirror 14 is now scanning a data section above the center of plate 15. Because this is a flat plate, the path length AB of the ray emanating from the plate 15 to the mirror 14 is increased by an amount $\delta$ over the path length A'B' of FIG. 3. At the same time this ray AB is decreased by an amount approximating $$2\left(\frac{\delta}{2}\right)$$

over A'B' due to the approach of the mirror face to the plate, thus canceling out the added distance. In FIG. 2 the light ray AB must travel a distance $\delta$ greater than the distance traveled by the ray A'B'; but because the mirror is closer to the data segment by a distance of $\delta/2$, the ray A'B' from the center of the plate need not traverse the $\delta/2$ path twice. Thus the path lengths of the two rays AB and A'B' are approximately equal. The lengthening of the path length A'B' when scanning a point at a distance from the center of the plate is thus compensated by the swing of the mirror closer to the plate when this point is scanned. The maintenance of the constant path length is made possible by directly reflecting the object or data plate rather than an image formed by an objective lens placed before mirror 6.

The preferred embodiment utilizes a mirror drum radius twice the distance of the plate-to-mirror separation. This plate-to-mirror separation is measured as the distance from the center of the plate to the mirror face when the center of the mirror face is coincident with the optical axis. The drum radius is shown as R in FIG. 1 while the plate-to-mirror separation is represented as R'.

Since the above equality of path lengths is only approximately correct for all ratios of R to R', it has been found that best resolution in the system occurs when $R/R'=2$. This relationship is derived from the following equation for path length:

$$P=\frac{R'}{\cos \alpha}-R\left(\frac{1}{\cos \alpha/2}-1\right)\left(\frac{1}{\cos \alpha}+1\right)+B'+X'$$

where:

P = path length from plate 1 to lens 9
R' = plate 1 to mirror 6 separation
R = radius of mirror drum 12
$\alpha$ = twice the mirror inclusion angle
B'+X' = fixed distance between lens 9 and locus of mirror centers 7

The following equations are derived as a result of finding the rate of change of path length with respect to inclination angle, $\alpha$ and equating this derivative to zero.

Defining $$\rho=\frac{R}{R'}$$

$$\rho=\frac{\sin \alpha \cos^2 \alpha}{\left(\frac{\sin \alpha/2}{2\cos^2\frac{\alpha}{2}}\right)\left(\frac{1}{\cos \alpha}+1\right)+\left(\frac{\sin \alpha}{\cos^2 \alpha}\right)\left(\frac{1}{\cos\frac{\alpha}{2}}-1\right)}$$

Although this equation does not lend itself well to explicit solution, it has been found that by substituting several values of $\alpha$, the required value of $\rho$ lies extremely close to 2.0 for values of $\alpha$ up to about 30°. In fact if $R=2R'$ and the path length is computed for several inclination angles for values of $\alpha$ up to about 20°, the path length changes less than 0.02%. This means that the magnification of the system changes by the same amount and Keystone effect occurs only to that extent. Hence, distortions of the image produce dimensional changes of that order of magnitude. These results indicate that on a photographic plate four inches wide, a maximum tracking error of 0.004 inch (measured from the center of the plate where the tracking is perfect) at either edge and at an elevation corresponding to a 10° mirror inclination (20° scanning angle) is obtained. In this configuration the maximum readout rate was found to be 50 mega words per second with bits of .0001 of an inch in height. The word length is determined by the number of photodetectors reading in parallel.

While the above photographic data is said to be semi-permanent in nature, the above system will work with any type of data placed on a transparent surface. This could include cathode ray tracing on photoluminescent screens as well as erasable data of any sort.

Obviously many modifications and variations of the present invention are possible in the light of the above teachings. It is therefore to be understood that within the scope of the appended claims the invention may be practiced otherwise than as specifically described.

What is claimed is:

1. An optical readout system for scanning a plate containing binary information and detecting said information comprising:

a transparent plate having bits of binary data recorded in rows thereon;

means for illuminating said transparent plate on one side thereof;

a drum located on the other side of said transparent plate and mounted for rotation about an axis perpendicular to the optical axis defined by the center of said illuminating means and the center of said transparent plate;

a planar mirror mounted on the periphery of said drum such that the distance between the center of revolution of said drum and the center of said mirror is twice the distance between said transparent plate and the center of said mirror when the center of said mirror lies on said optical axis, said mirror successively scanning different rows as said drum rotates and said mirror assumes different angular orientations with respect to said optical axis;

means for focusing the light reflected by said mirror, whereby for any given angular orientation of said mirror only one of said rows will be in focus; and photodetectors located in the focal plane of said focusing means and adapted to generate a series of output signals whose waveforms correspond to the bits of information contained in the row being scanned by said mirror.

2. The system as recited in claim 1 wherein a beam splitting means is positioned between said transparent plate and said mirror along said optical axis, said beam splitting means being adapted both to pass light coming from said transparent plate and to reflect light reflected by said mirror to said focusing means.

3. The system as recited in claim 2 wherein said beam splitting means is a half-silvered mirror mounted at an angle of 45° with respect to said optical axis.

4. The system as recited in claim 2 wherein said transparent plate is a photographic plate.

References Cited

UNITED STATES PATENTS

| | | |
|---|---|---|
| 2,769,379 | 11/1956 | Peery. |
| 2,769,922 | 11/1956 | Peery. |
| 2,812,447 | 11/1957 | Mac Martin et al. |
| 3,109,933 | 11/1963 | Baumann. |
| 3,198,951 | 8/1965 | Lentze _____ 250—214 X |
| 3,005,916 | 10/1961 | Lentze. |
| 3,205,367 | 9/1965 | Whitesell. |
| 3,251,952 | 5/1966 | Shomer. |
| 3,360,659 | 12/1967 | Young _____ 356—203 X |

ARCHIE R. BORCHELT, Primary Examiner

C. M. LEEDOM, Assistant Examiner

U.S. Cl. X.R.

178—7.6; 350—203, 206